(12) United States Patent
Straub

(10) Patent No.: US 7,568,461 B1
(45) Date of Patent: Aug. 4, 2009

(54) TAPPET ROLLER END SHAPE FOR IMPROVED LUBRICATION AND COMBINATION WITH FUEL PUMP AND ENGINE

(75) Inventor: Robert D. Straub, Lowell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/143,218

(22) Filed: Jun. 20, 2008

(51) Int. Cl.
*F01L 1/14* (2006.01)
*F16H 53/06* (2006.01)

(52) U.S. Cl. ..................... 123/90.48; 74/569

(58) Field of Classification Search .............. 123/90.48, 123/90.51; 74/569
See application file for complete search history.

(56) References Cited

U.S. PATENT DOCUMENTS

| | | | | |
|---|---|---|---|---|
| 3,108,580 A * | 10/1963 | Crane, Jr. | ................... | 123/90.5 |
| 4,412,513 A * | 11/1983 | Obermayer et al. | ........ | 123/54.4 |
| 4,739,675 A * | 4/1988 | Connell | ........................ | 74/569 |
| 4,885,952 A * | 12/1989 | Connell | ........................ | 74/569 |
| 5,188,068 A * | 2/1993 | Gaterman et al. | ........ | 123/90.35 |
| 5,385,124 A * | 1/1995 | Hillebrand et al. | ......... | 123/90.5 |
| 5,390,642 A * | 2/1995 | Thoma | ....................... | 123/508 |
| 5,419,298 A * | 5/1995 | Nolte et al. | ................ | 123/508 |
| 5,479,903 A * | 1/1996 | Werner et al. | ................ | 123/509 |
| 5,564,395 A * | 10/1996 | Moser et al. | ................ | 123/509 |
| 5,603,303 A * | 2/1997 | Okajima et al. | ............. | 123/508 |
| 5,931,133 A * | 8/1999 | Giannone et al. | .......... | 123/90.5 |
| 5,979,416 A * | 11/1999 | Berger | ......................... | 123/509 |
| 5,992,393 A * | 11/1999 | Yoshida et al. | .............. | 123/509 |
| 6,138,641 A * | 10/2000 | Moser | ........................ | 123/456 |
| 6,145,493 A * | 11/2000 | Espey | .......................... | 123/509 |
| 6,209,498 B1 * | 4/2001 | Brothers | .................... | 123/90.5 |
| 6,216,583 B1 * | 4/2001 | Klinger et al. | ................ | 92/129 |
| 6,217,299 B1 * | 4/2001 | Jay | ............................ | 417/470 |
| 6,321,724 B1 * | 11/2001 | Winsor | ....................... | 123/509 |
| 6,405,698 B1 * | 6/2002 | Steinmetz | ................ | 123/90.48 |
| 6,439,204 B1 * | 8/2002 | Duquette | ..................... | 123/506 |
| 6,814,040 B2 * | 11/2004 | Hendriksma et al. | ..... | 123/90.59 |
| 7,156,079 B2 * | 1/2007 | Kamiyama et al. | .......... | 123/508 |
| 7,497,157 B2 * | 3/2009 | Aoki et al. | ..................... | 92/129 |
| 2001/0004886 A1 * | 6/2001 | Brothers | .................. | 123/90.48 |
| 2003/0059321 A1 * | 3/2003 | Ikegami et al. | .............. | 417/470 |
| 2006/0288974 A1 * | 12/2006 | Meisborn et al. | ......... | 123/90.48 |

* cited by examiner

*Primary Examiner*—Thomas N Moulis

(57) ABSTRACT

Improved end shapes are provided for laterally confined tappet rollers in high pressure fuel pumps and similar applications for improving lubrication and wear performance when rotating against a cylindrical surface. The roller ends are provided with annular end faces having diameters smaller than the roller diameter but spaced around the roller axis. Rotation of a roller end against a cylindrical surface provides two contact areas on opposite sides of a central plane through the axes of the roller and the cylindrical surface. The arrangements separate the surfaces between engagements with the contact areas and permit lubricant to reach the end face surfaces between contacts with the two areas. The improved tappet roller should improve service life for the fuel pumps and engine fuel systems in which they are employed.

15 Claims, 4 Drawing Sheets

TAPPET ROLLER END SHAPE FOR IMPROVED LUBRICATION AND COMBINATION WITH FUEL PUMP AND ENGINE

TECHNICAL FIELD

This invention relates to internal combustion engines, high pressure fuel pumps therefor and roller tappets usable in such fuel pumps and including roller end shapes for improved lubrication of laterally confined rollers.

BACKGROUND OF THE INVENTION

It has been found that roller tappets having laterally confined rollers with spherical ends and single point engagement with a cylindrical retainer have experienced excessive wear in applications such as high pressure fuel injection pumps. A solution to the wear problem was desired.

SUMMARY OF THE INVENTION

The present invention provides improved end shapes for use in laterally confined tappet rollers in high pressure fuel pumps and similar applications for improving lubrication and wear performance when rotating against a cylindrical end surface. The roller ends are provided with annular end faces having diameters smaller than the roller diameter but spaced outward of the roller axis. The rotation against a cylindrical surface provides two contact areas on opposite sides of a central plane through the axes of the roller and the cylindrical surface. The arrangements separate the surfaces between engagement with the contact areas and permit lubricant to reach the end face surfaces between contacts with the two areas.

These and other features and advantages of the invention will be more fully understood from the following description of certain specific embodiments of the invention taken together with the accompanying drawings.

DESCRIPTION OF AN EXEMPLARY EMBODIMENT

Figure 1:
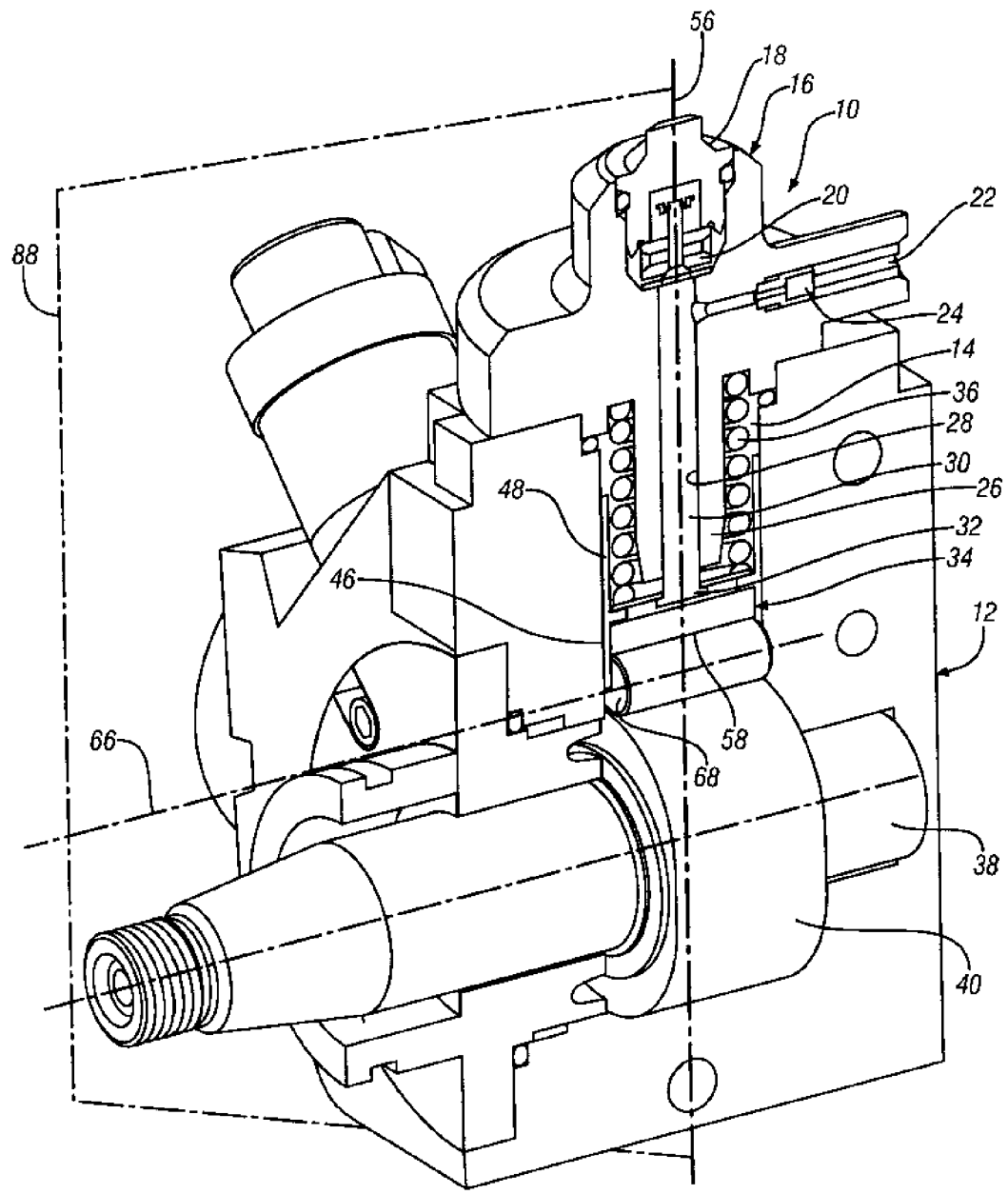
FIG. 1 is a cross-sectional view parallel with the camshaft of a high pressure fuel injection pump.
Figure 2:
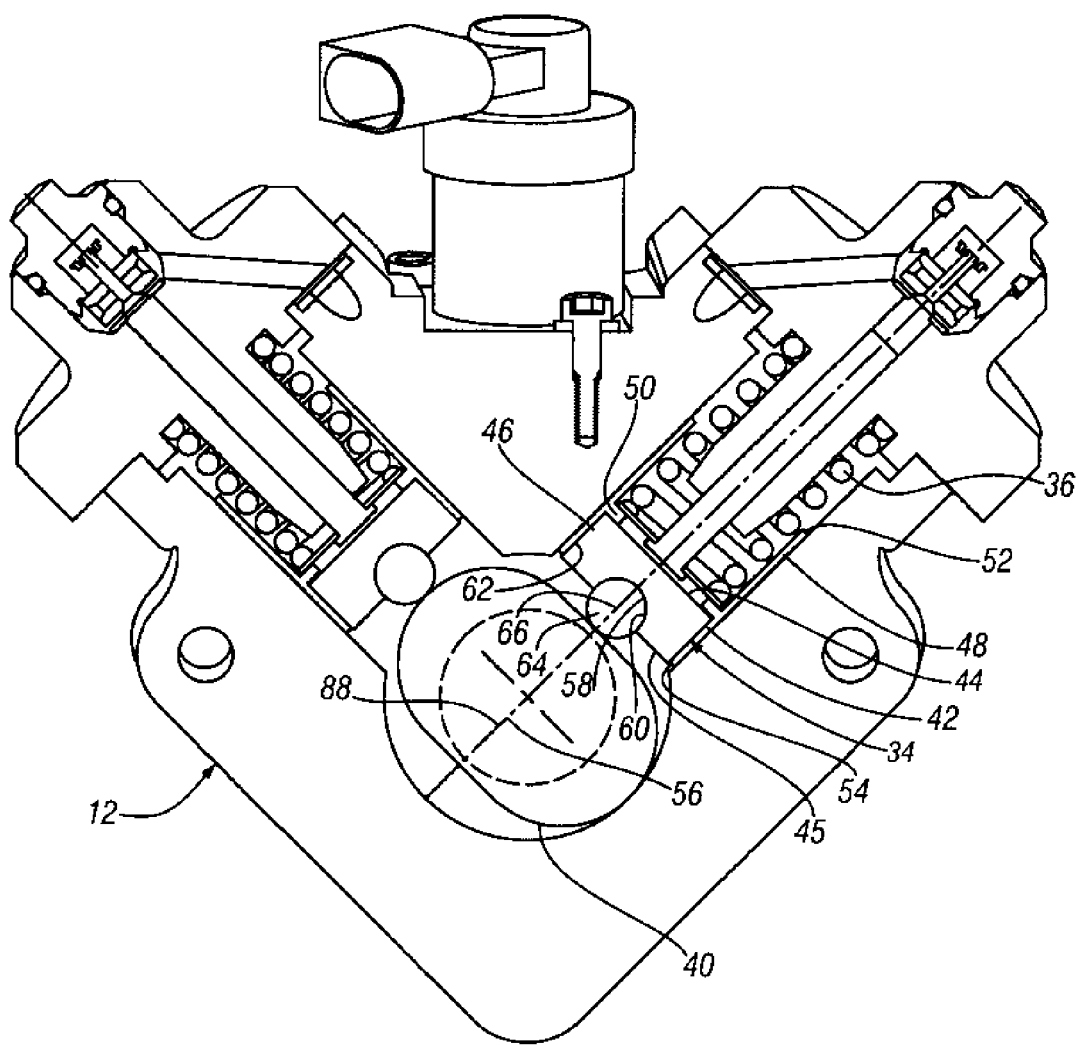
FIG. 2 is a cross-sectional view of a similar pump taken perpendicular to the camshaft.
Figure 3:
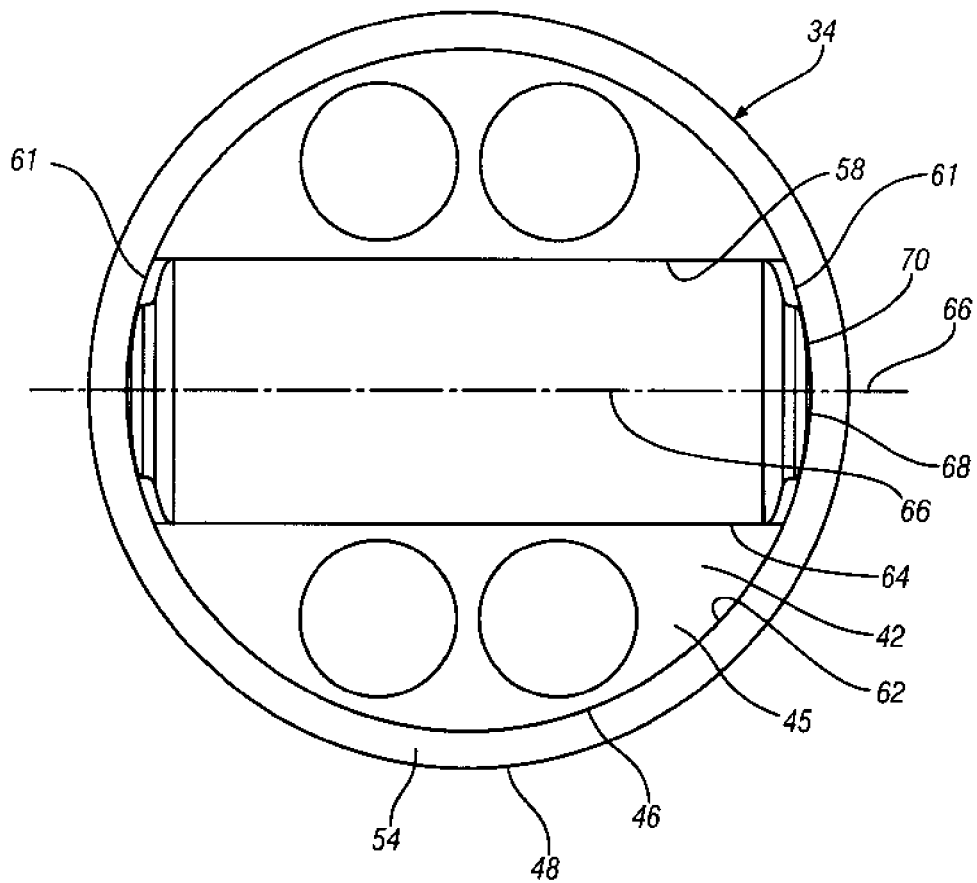
FIG. 3 is a bottom view of a roller tappet according to the invention for the pumps of FIGS. 1 and 2.
Figure 4:
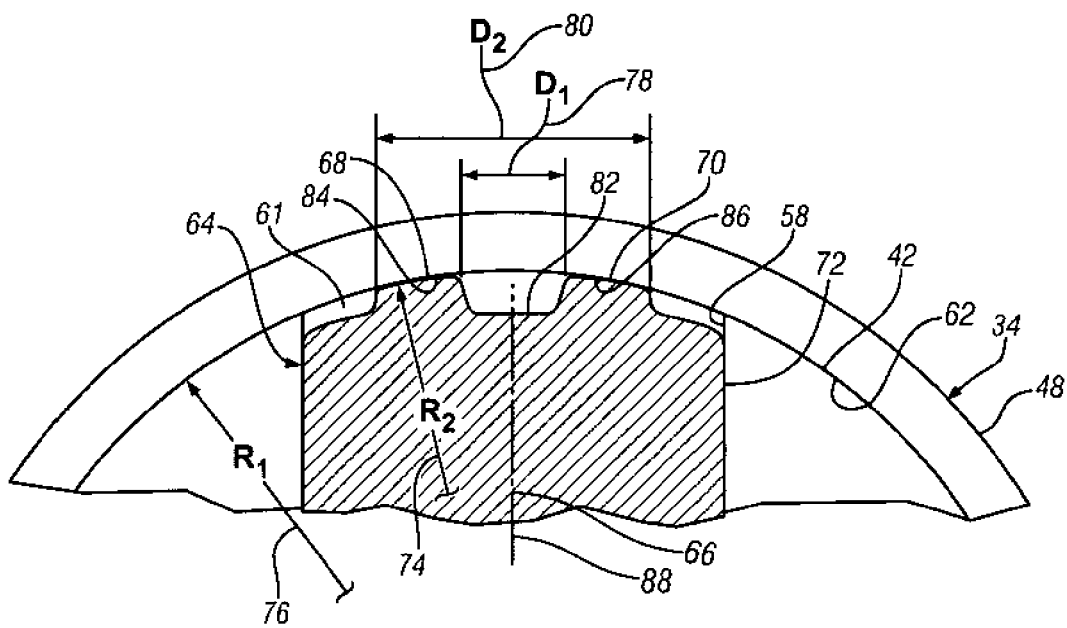
FIG. 4 is an enlarged cross-sectional view of a lower end of a follower roller tappet according to the invention showing the relation of the roller to the cylindrical inner wall of a guide sleeve.

Referring now to the drawings in detail, numeral 10 generally indicates an engine high pressure fuel injection pump of a type in which a roller tappet according to the present invention could be utilized. Injection pump 10 includes a main body 12 defining a fuel pumping cylinder 14 closed at one end by a cylinder head 16.

The cylinder head contains a fuel inlet port 18 including a suction valve 20 and an outlet port 22 including a high pressure discharge valve 24. A pumping nose 26, extending into the cylinder 14, defines a plunger bore 28 into which a pump plunger 30 extends. The plunger 30 carries a shoe 32, which seats against a roller tappet 34. A compression spring 36 surrounding the pumping nose 26 extends between the cylinder head 16 and the roller tappet 34.

The main body 12 rotatably supports a camshaft 38 carrying a two-lobed cam 40, which engages the roller tappet 34.

In accordance with the invention, the roller tappet 34 includes a follower body 42 having upper and lower sides 44, 45 and a generally cylindrical outer periphery 46. A generally cylindrical guide sleeve 48 receives the follower body 42 in a lower portion of the sleeve and may include an inner rim 50 spaced between opposite upper 52 and lower 54 ends. The guide sleeve 48 is biased downward by the compression spring 36 and engages the follower body 42 of the roller tappet for reciprocation of the guide sleeve 48 and follower body 42 along a longitudinal axis 56 of the pumping cylinder 14. The compression spring 36 also biases the shoe 32 of the pump plunger 30 to maintain the shoe in contact with the roller tappet 34. The lower side 45 of the follower body 42 includes a downwardly open recess 58 with a part cylindrical inner bearing surface 60 extending laterally across the follower body 42 and having open ends 61. In assembly, the follower body 42 is fitted within a cylindrical inner wall 62 of the guide sleeve with the lower side 45 of the follower body 42 lying co-planer with the lower end 54 of the guide sleeve 48, thereby blocking the open ends 61 of the lateral recess 58.

The roller tappet 34 is completed by a follower roller 64, which is rotatably received within the recess 58 for rotation about the roller axis 66 and is engagable with the cam 40 for reciprocating the roller tappet 34 and operating the pump plunger 30. Lateral motion of the roller 64 within the recess 58 is limited by engagement of ends 68 of the roller with the guide sleeve inner wall 62. In accordance with the present invention, the roller ends 68 are each provided with an annulus 70 that is engagable with the sleeve inner wall 62 at a radial location on the roller end that is spaced outward of the roller axis 66 and inward of the outer diameter 72 of the roller.

Experience has shown that rounded ends for the roller with a radius smaller than the radius of the sleeve inner wall, wherein the roller contacts the sleeve wall at a single point on the roller axis, prevents the delivery of adequate lubrication to the contact point, resulting in excessive wear of the sleeve wall. On the other hand, providing the roller with square ends that would form an annulus that would contact the sleeve at the outer diameter of the roller could cause excessive sliding contact velocity that might result in excessive wear. The present invention, wherein the annulus is formed with a diameter between the axis and the outer diameter of the roller has been found to significantly improve lubrication and extend the wear life of the components.

In a proposed embodiment, the end 68 of the follower roller 64 is formed with an annulus 70 having a face radius 74 ($R_2$) similar to the radius 76 ($R_1$) of the sleeve inner wall 62 of the guide sleeve 48. The annulus 70 has an inner diameter 78 ($D_1$) about one-third the outer diameter 80 ($D_2$). Portions of the end 68 radially within and without the annulus are recessed or relieved so that the annulus 70 forms a protrusion at the end 68 of the roller 64. The recessed portion within the annulus may form a lubricant pocket 82 for promoting lubrication of the annulus. Thus, only the face radius 74 contacts the sleeve inner wall and the contact is limited to two contact areas 84, 86 spaced equally on opposite sides of a central plane 88 defined by the intersecting axes 56, 66 of the guide sleeve 48 and the roller 64. At other locations, the face radius 74 of the annulus 70 is lifted off the inner wall 62 of the guide sleeve 48 and is open to contact by ambient lubricant from the cam supply.

Many factors may need consideration to determine a preferred configuration for a particular application. One factor would be if the lubricant to be used is a fuel to be pumped by a high pressure injection pump, were the lubricity of the fuel may be a major factor. Thus, as a non-limiting example, an outer diameter of the annulus could be about 3 times larger than an inner diameter thereof and an outer diameter of the roller could be about 1½ times larger than the outer diameter of the annulus.

In a simplified form, the invention has been carried out by forming a flat end portion, not shown, on the part spherical end of a prior roller. The intersection of the flat portion with the spherical end forms an annulus, which engages the guide sleeve inner wall 62 at spaced contact locations as described above. At other locations, the annulus is spaced from the inner wall 62 so that lubricant is able to reform on the annulus. This form of the invention has resulted in extended wear life of the components.

In the embodiments discussed above, the lubrication may be provided by the liquid fuel being pumped by the high pressure fuel injection pump 10.

Figure 5:
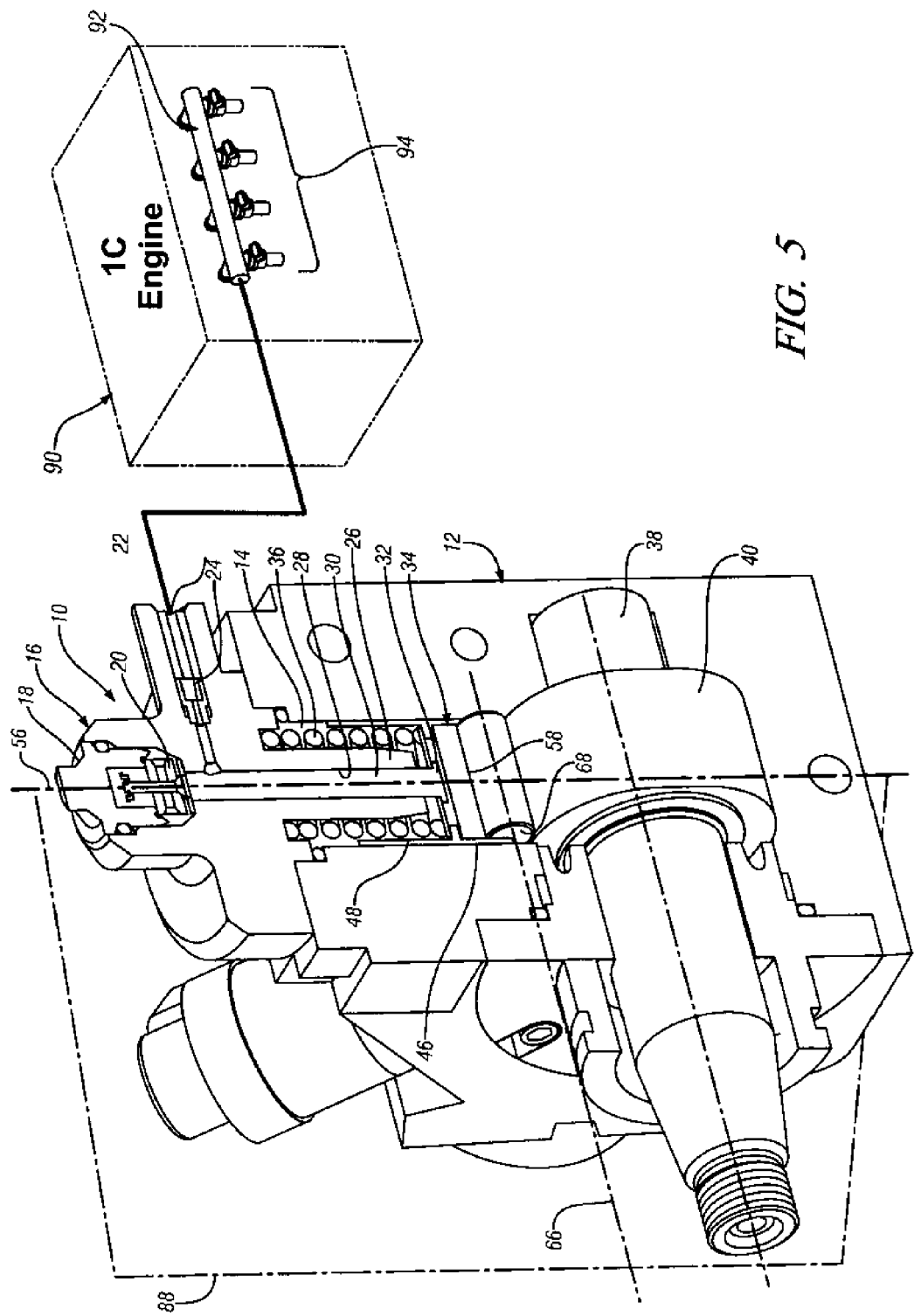
FIG. 5 is a view similar to FIG. 1 showing the combination of the pump of FIG. 1 with an engine.

Referring to FIG. 5, there is disclosed a combination of a fuel pump assembly as shown in FIG. 1 with an internal combustion engine 90 having a high pressure fuel system 92 connected to conduct fuel from the from the fuel pump outlet port 22 to multiple fuel injectors 94 for delivery to associated engine cylinders, not shown.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A roller tappet for use with a cam actuated mechanism, the tappet comprising:
    a follower body having upper and lower sides and a generally cylindrical periphery, a guide sleeve fitted around the periphery and extending from the lower side to and a substantial distance beyond the upper side of the follower body, and a cylindrical follower roller rotatable about a roller axis in a part cylindrical recess extending laterally across the lower side of the follower body, the recess having laterally open ends closed by a generally cylindrical inner wall of the guide sleeve surrounding the follower body;
    the follower roller being engagable with a rotatable cam of a liquid lubricated mechanism for axially reciprocating the tappet within a cylinder of the mechanism, the upper side of the follower body being engagable with a shoe of a high pressure fuel pump plunger for reciprocating the plunger to pump liquid fuel, and the guide sleeve receiving a spring operable to bias the follower roller against the cam and the plunger shoe against the upper side of the follower body to operate the pumping mechanism;
    the follower roller being free to move laterally in the recess and having laterally opposite ends engagable with the inner wall of the guide sleeve to limit lateral motion of the roller within the recess;
    at least one of the roller ends being formed with an annulus engagable with the sleeve inner wall at radial locations spaced outward of the roller axis and inward of the outer diameter of the roller, portions of the at least one roller end both inward and outward of the annulus being configured to prevent contact with the inner wall of the guide sleeve;
    whereby external lubricant reaching the annulus and the skirt interior prevents excessive wear at the roller/wall interface.

2. A roller tappet as in claim 1 wherein both ends of the roller include an annulus and are similarly configured to prevent excessive wear.

3. A roller tappet as in claim 2 wherein both ends of the roller are relieved outward of the annulus to form a circular protrusion at each roller end to promote free entry of lubricant to the annulus.

4. A roller tappet as in claim 3 wherein both ends of the roller are relieved inward of the annulus to form lubricant pockets for promoting lubrication of the annulus.

5. A roller tappet as in claim 2 wherein outer faces of the annulus are formed with a radius centered on the roller axis and similar to the radius of the guide sleeve inner wall engagable by the annulus.

6. A roller tappet as in claim 5 wherein an outer diameter of the annulus is about 3 times larger than an inner diameter thereof.

7. A roller tappet as in claim 6 wherein an outer diameter of the roller is about 1½ times larger than the outer diameter of the annulus.

8. A high pressure fuel pump assembly for an internal combustion spark ignition engine, the pump assembly comprising:
    a camshaft rotatable in a main body and carrying a cam engaging a follower roller of a roller tappet for reciprocating the tappet in a pumping cylinder of the main body;
    the tappet engaging a plunger and a return spring for reciprocating the plunger in a plunger bore to pump fuel in through an inlet port and out through an outlet port;
    the tappet including a follower body having a part cylindrical recess extending laterally across a lower side of the follower body and having laterally open ends, and a peripheral guide sleeve fitted around and extending to the lower side of the of the follower body and having a generally cylindrical inner wall closing the ends of the recess, the follower roller being received in the recess and free to rotate on a lateral axis of the roller and to move laterally in the recess, the roller having ends engagable with the inner wall of the guide sleeve to limit lateral motion of the roller; and
    at least one of the roller ends being formed with an annulus engagable with the sleeve inner wall at radial locations spaced outward of the roller axis and inward of the outer diameter of the roller, portions of the at least one roller end both inward and outward of the annulus being configured to prevent contact with the inner wall of the guide sleeve;
    whereby external lubricant reaching the annulus and the skirt interior prevents excessive wear at the roller/wall interface.

9. A fuel pump assembly as in claim 8 wherein both ends of the roller include an annulus and are similarly configured to prevent excessive wear.

10. A fuel pump assembly as in claim 9 wherein both ends of the roller are relieved outward of the annulus to form a circular protrusion at each roller end to promote free entry of lubricant to the annulus.

11. A fuel pump assembly as in claim 10 wherein both ends of the roller are relieved inward of the annulus to form lubricant pockets for promoting lubrication of the annulus.

12. A fuel pump assembly as in claim 9 wherein outer faces of the annulus are formed with a radius centered on the roller axis and similar to the radius of the guide sleeve inner wall engagable by the annulus.

13. A fuel pump assembly as in claim 12 wherein an outer diameter of the annulus is about 3 times larger than an inner diameter thereof.

14. A fuel pump assembly as in claim 13 wherein an outer diameter of the roller is about 1½ times larger than the outer diameter of the annulus.

15. In combination, a fuel pump assembly as in claim 8 and an internal combustion engine having a high pressure fuel system including at least one fuel injector wherein a fuel outlet port of the fuel pump is connected to the at least one fuel injector of the fuel system.

* * * * *